United States Patent

[11] 3,575,430

| [72] | Inventor | Albert Earl Alpine<br>Norristown, Pa. |
|---|---|---|
| [21] | Appl. No. | 790,320 |
| [22] | Filed | Jan. 10, 1969 |
| [45] | Patented | Apr. 20, 1971 |
| [73] | Assignee | Certain-Feed Products Corporation<br>Ardmore, Pa. |

[54] PIPE JOINT PACKING RING HAVING MEANS LIMITING ASSEMBLY MOVEMENT
1 Claim, 2 Drawing Figs.

[52] U.S. Cl. .................................................... 277/168,
285/230, 285/110, 277/207, 277/209
[51] Int. Cl. ......................................................... F16l 49/00,
F16l 17/02
[50] Field of Search........................................... 285/230,
231, 110, 345; 285/288 (Cursory), 111 (Cursory);
277/58 (Cursory); 277/208, 207 (A), 209, 210,
168

[56] References Cited
UNITED STATES PATENTS

| 2,443,506 | 6/1948 | Hohl et al. ..................... | 285/110X |
| 2,529,098 | 11/1950 | Noll............................... | 285/231X |
| 2,914,345 | 11/1959 | Osborn.......................... | 285/110 |
| 3,081,102 | 3/1963 | Murray et al. ................. | 277/207A |
| 3,219,354 | 11/1965 | Kazienko....................... | 277/207A |
| 3,265,410 | 8/1966 | Lorang.......................... | 285/110 |
| 3,386,745 | 6/1968 | Hein............................... | 277/209X |

FOREIGN PATENTS

| 1,269,188 | 7/1961 | France ......................... | 277/207A |

Primary Examiner—Thomas F. Callaghan
Attorney—Synnestvedt & Lechner

ABSTRACT: Equipment for use in connecting sections of pipe comprising spigot and socket parts, the socket part having an annular channel for receiving the main body of a packing ring, the spigot part having a shoulder presented inwardly of the joint, and the packet ring having a flange projecting inwardly of the joint from the channel in the socket part and having an enlargement at its free edge adapted to cooperate with the shoulder on the spigot part to limit assembly movement of the socket and spigot parts.

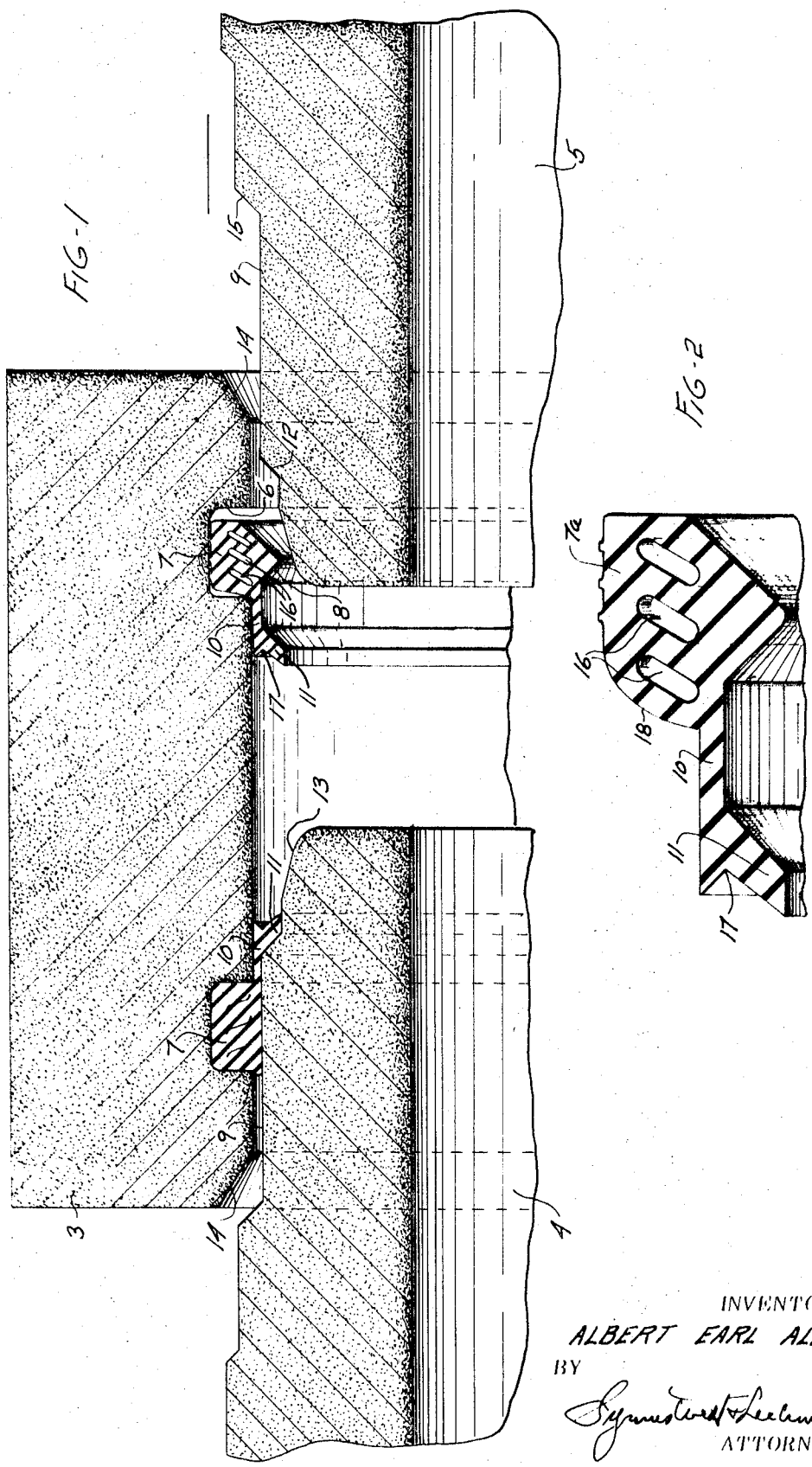

PIPE JOINT PACKING RING HAVING MEANS LIMITING ASSEMBLY MOVEMENT

This invention relates to pipe connection equipment and is particularly concerned with a gasket or packing ring arrangement comprising a main annular body serving the packing or sealing function of the joint and also having a novel configuration cooperating with the spigot part of the joint to limit assembly motion of the joint.

Although the invention is adaptable to pipe of a variety of types, it is particularly useful in connection with asbestos-cement pipes or pipe sections such as are quite widely used in water supply and sewage disposal systems. Pipe lines formed of such asbestos-cement compositions are commonly run underground so that the pipe sections are subject to underground moisture. Depending upon the particular method employed in the production of the asbestos-cement pipe sections, and especially depending upon the character of the curing of the cement, the pipe sections are subject to expansion in consequence of absorption of moisture when the pipe is laid underground or buried. This expansion is commonly of appreciable magnitude, running as high as one-eighth to one-fourth of an inch or even somewhat more for a pipe section 13 feet long.

Unless provision is made for maintaining the ends of pipe sections in appreciably spaced relation when the pipe sections are initially laid, the expansion or growth incident to moisture absorption and also to thermal changes, may cause the ends of adjacent sections of the pipe to come in contact with each other, and if the contact pressure is appreciable, may even result in buckling of the joint or other damage to or breakage of the joint or pipe sections.

It is a principal object of the present invention to provide a simple and yet highly reliable arrangement for limiting the assembly movement of spigot and socket joint parts, especially in a connection in which the spigot part comprises a sleeve into opposite ends of which the adjacent ends of a pair of pipe sections are inserted.

It is a further object to provide such limitation upon the assembly motion that the adjacent ends of a pair of pipe sections inserted into a connection sleeve will be spaced sufficiently to accommodate all normal expansion incident to growth from moisture absorption or thermal expansion.

A further object of the invention is to combine the positioning or spacing means with the packing or sealing means, so that the insertion of the packing ring in its proper position in a joint will at the same time establish an abutment limiting the assembly motion of the spigot and socket parts.

How the foregoing and other objects and advantages are attained will appear more fully from the following description referring to the accompanying drawing, in which:

FIG. 1 is a partial longitudinal sectional view through pipe connection equipment according to the present invention, this view showing a connection sleeve adapted to cooperate with the adjacent ends of a pair of pipe sections, and showing one of the pipe sections inserted in the sleeve to the limit of the assembly motion established by the equipment, and showing the other of the pipe sections only partially inserted; and FIG. 2 is a fragmentary sectional view through a modified form of packing ring which may be used in a joint of the kind shown in FIG 1, this view being on a larger scale than FIG. 1.

As will be seen from FIG. 1 the joint includes a joint sleeve 3 presenting joint sockets at each end for receiving the end portions of a pair of pipe sections, the latter being indicated at 4 and 5 in FIG. 1. Toward each socket end of the sleeve 3 an annular channel 6 is provided for receiving the gasket or packing ring cooperating with the spigot part of the pipe inserted into that end of the sleeve.

As seen toward the right of FIG. 1, the main body portion 7 of a packing ring is received in the annular channel 6. The main body of the packing ring has an internal projection indicated at 8 positioned to engage the spigot part to be inserted and to compress the main body of the packing ring within the annular channel and thereby establish the desired seal between the socket part and the spigot part of the joint. This compression is established in large part by engagement of the projection 8 with the surface 9 on the spigot part, as will be clear from inspection of the left end of FIG. 1 in which the end or spigot part of the pipe section 4 has been inserted to the intended extent into the sleeve 3.

The packing ring is further provided with an annular flange 10 projecting from the body 7 of the ring inboard of the joint, i.e., in a direction toward the interior of the sleeve 3. This flange is extended from the radially inner portion of the main body 7 in a position lying adjacent the inner surface of the sleeve 3. The free edge of the flange 10 is enlarged as indicated at 11 in order to form an abutment or limiting stop for the assembly motion of the spigot part into the sleeve. The flange 10 is of some appreciable width, so that the cross-sectional shape of the packing ring appears as a body having a tail projecting at one side.

The enlargement 11 at the free edge of the flange 10 is adapted to cooperate with the shoulder 12 formed on the spigot part or end portion of the pipe section. This should is presented inwardly of the joint and, when the spigot part is inserted to the extent indicated at the left side of FIG. 1, the shoulder 12 engages the enlargement 11 at the free edge of the flange 10 and limits the assembly motion of the parts.

In the embodiment illustrated in FIG. 1, each spigot part is provided with a bevel 13 at its end and, in addition, the ends of the opening in the sleeve 3 are beveled as indicated at 14, these beveled surfaces serving to facilitate insertion of the spigot part into the socket of the sleeve. The shoulder 12 also acts to effect a substantial amount of compression of the body 7 of the ring as the spigot part is inserted to bring the surface 9 inside of the ring body 7.

The spigot part is still further provided with a shoulder 15 which, in cooperation with the flared or beveled opening 14 of the sleeve, will prevent abnormal insertion of the spigot part into the sleeve, although it will be understood that it is not intended that the shoulder 15 should come into engagement with the flared surface 14 and will not do so if the insertion or assembly motion is not forced beyond the abutment or limiting stop provided by the enlargement 11 of the flange 10 engaging the shoulder 12.

The surface 9 of the spigot part, as appears in FIG. 1, is somewhat smaller in diameter than the interior of the sleeve 3, this being desirable in order to accommodate minor angular and parallel misalignment of the spigot and socket parts. This spacing between the surface 9 and the interior of the sleeve is also desired in order to accommodate the flange 10 of the packing ring.

In the embodiment as shown in FIG. 1 the two annular channels toward opposite ends of the sleeve 3 are so spaced from each other that when both of the spigot parts of the adjacent ends of the pipe sections are inserted to the extent limited by the interengagement of the enlargements 11 and the shoulders 12, there will still remain between the ends of the spigot parts some appreciable spacing, for instance a spacing of about one-half inch in a joint system used for coupling pipe sections 13 feet in length.

The body 7 of the packing ring is desirably provided with some interior annular cavities such as indicated at 16 in order to provide for maintenance of an effective pressure seal even where minor variations in sizes and shape of the spigot and socket parts are encountered. It will be observed that toward the left of FIG. 1 these annular cavities are virtually closed. The inwardly presented face of the enlargement 11 of the flange 10 is also desirably notched as indicated at 17 for a purpose similar to that explained above with reference to the annular cavities 16 in the body 7.

FIG. 2 represents a packing ring very similar to that illustrated in FIG. 1, but for the purpose of providing additional leeway for compression of the body of the ring, in FIG. 2 the ring body 7a is further cut away at one edge as indicated at 18, so that this edge of the ring is formed with a curved surface providing more space within the annular channel of the socket part to accommodate ring compression.

The packing rings of the present invention are formed of resilient material, desirably rubber and it is contemplated that the rings may be fabricated by the extrusion of a piece having the cross section of the ring and then cutting off lengths of the extrusion and flexing them to annular form, with the free ends adhesively bonded to each other or secured together in any other desired manner.

Preferably the rubber composition of which the packing ring is formed is somewhat distensible and resilient, so that upon expansion of the pipe section with which the packing ring is associated, the enlargement 11 at the edge of the flange 10 will accommodate such expansion. In this way the enlargement 11 will retain its proper position with reference to the stop shoulder 12 on the socket part even though some expansion and contraction occur. The fact that the flange 10 is of some appreciable width is also of importance in providing this capability of accommodating expansion of the socket part while retaining the desired relation between the enlargement 11 and the shoulder 12.

Although in the embodiments described with reference to the drawings, the joint is made up of a sleeve receiving a pair of pipe sections, so that the sleeve in effect has a pair of socket parts, one at each end, receiving the spigot parts which constitute the ends of the pipe sections, a similar joint may be employed where the spigot part is formed on the end of one pipe section, and the socket part is formed directly on the end of an adjoining pipe section. In this situation also it is desirable to limit the assembly motion and to provide clearance for expansion of the pipe sections either as a result of thermal changes or as a result of absorption of moisture.

The arrangement of the invention provides an exceedingly simple system for packing or sealing a joint and at the same time limiting the assembly motion. The packing rings utilized for these several purposes may be formed entirely of a single material, which is of substantial advantage as compared with certain prior arrangements which required the employment of separate parts or the employment of a packing ring of which different portions are formed of different materials.

The arrangement of the invention provides for an effective seal and for limiting the assembly motion even where angular and parallel misalignment and irregularities of dimensions are encountered.

I claim:

1. A pipe connection comprising spigot and socket pipe joint parts constructed to provide for telescoping and separation thereof by relative axial motion, the socket part having an annular channel formed in its inside wall, the spigot part having a cylindrical surface in the region of said channel of smaller diameter than the inside of the socket to provide an annular space between the joint of the spigot part having a shoulder presented inwardly of the joint and spaced inboard of the annular channel in the socket part and the spigot part being extended inboard of said shoulder and having a beveled end spaced inwardly of said shoulder, and a resilient pipe joint ring between the joint parts, the ring having a sealing portion in compression between the base of the annular channel in the socket part and said cylindrical surface on the spigot part and the ring having a flange extended inwardly from the radially inner edge of the sealing portion in said annular space between the socket and spigot parts, said flange having an enlarged portion at its inner or free edge located inboard of said shoulder and serving as an abutment limiting telescoping movement of the spigot into the socket, said enlarged portion being in compression between the socket and the part of the spigot extended inboard of said shoulder.

UNITED STATES PATENT OFFICE
CERTIFICATE OF CORRECTION

Patent No. 3,575,430          Dated April 20, 1971

Inventor(s) Albert Earl Alpine

It is certified that error appears in the above-identified patent and that said Letters Patent are hereby corrected as shown below:

In the heading, line [73] the assignee should be --Certain Products Corporation--.

Column 2, line 19, "should" should read --shoulder--.

Signed and sealed this 27th day of June 1972.

(SEAL)
Attest:

EDWARD M. FLETCHER, JR.          ROBERT GOTTSCHALK
Attesting Officer                Commissioner of Patents